United States Patent [19]

Inoue

[11] Patent Number: 5,682,518

[45] Date of Patent: Oct. 28, 1997

[54] SYSTEM FOR UPDATING INACTIVE SYSTEM MEMORY USING DUAL PORT MEMORY

[75] Inventor: Haruko Inoue, Tokyo, Japan

[73] Assignee: NEC Corporation, Tokyo, Japan

[21] Appl. No.: 409,082

[22] Filed: Mar. 22, 1995

[30] Foreign Application Priority Data

Mar. 28, 1994 [JP] Japan ................... 6-079315

[51] Int. Cl.$^6$ ................... G06F 11/20
[52] U.S. Cl. ............... 395/489; 395/182.04; 395/182.9; 395/476
[58] Field of Search ............... 395/182.08, 182.09, 395/183.07, 476, 489

[56] References Cited

U.S. PATENT DOCUMENTS

| | | | |
|---|---|---|---|
| 4,610,013 | 9/1986 | Long et al. | 395/182.09 |
| 4,823,256 | 4/1989 | Bishop et al. | 395/182.08 |
| 4,958,273 | 9/1990 | Anderson et al. | 395/182.08 |
| 4,999,768 | 3/1991 | Hirokawa | 395/200.07 |
| 5,099,485 | 3/1992 | Bruckert et al. | 395/182.09 |
| 5,121,485 | 6/1992 | Ujiie | 395/250 |
| 5,202,980 | 4/1993 | Morita et al. | 395/182.09 |
| 5,276,842 | 1/1994 | Sugita | 395/476 |
| 5,307,471 | 4/1994 | Ishikawa | 395/280 |
| 5,341,473 | 8/1994 | Takayama | 395/200.08 |
| 5,418,938 | 5/1995 | Hatanaka et al. | 395/182.09 |
| 5,434,998 | 7/1995 | Akai et al. | 395/182.09 |
| 5,455,932 | 10/1995 | Major et al. | 395/182.08 |

*Primary Examiner*—Eddie P. Chan
*Assistant Examiner*—Hong C. Kim
*Attorney, Agent, or Firm*—Whitham, Curtis, Whitham & McGinn

[57] ABSTRACT

A system for updating an inactive system memory includes a first package set in an active state and having a first processor and a second package set in an inactive state and having a second processor. The first package includes a first buffer memory, a first write control unit for outputting a write control signal and an address signal to the first buffer memory in accordance with a write control signal output from the first processor to the first memory, and a first holding unit for holding update data and an address signal output from the first processor to the first memory, and outputting held contents as data of the first buffer memory in accordance with a write control signal output from the first write control unit to the first buffer memory. The second package has the same arrangement as the first package. The second processor in an inactive state updates the second memory in accordance with update data and address data set for the first memory and stored in the first buffer memory.

3 Claims, 3 Drawing Sheets

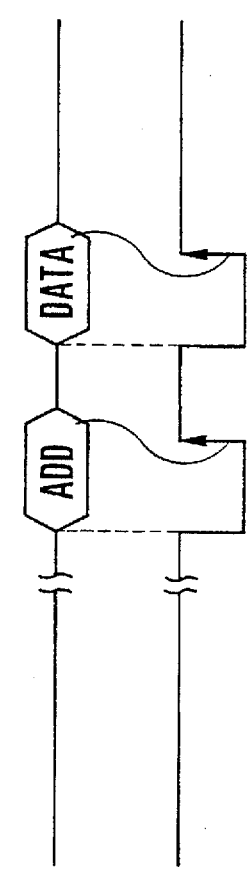
FIG. 2A  ADDRESS DATA
FIG. 2B  UPDATE DATA SIGNAL
FIG. 2C  WRITE CONTROL SIGNAL
FIG. 2D  OUTPUT 106 FROM COUNTER CIRCUIT 5
FIG. 2E  OUTPUT 108 FROM HOLDING CIRCUIT 7
FIG. 2F  WRITE CONTROL SIGNAL 107

SYSTEM FOR UPDATING INACTIVE SYSTEM MEMORY USING DUAL PORT MEMORY

BACKGROUND OF THE INVENTION

The present invention relates to a system for updating an inactive system memory in a duplex processing apparatus having duplexed packages, each incorporating a microprocessors.

A duplex processing apparatus is known in which, to improve the reliability of a system to which the apparatus is applied, two packages, each incorporating a microprocessor and having a data processing function, are duplexed. Such a duplex processing apparatus has two identical packages. With this arrangement, even if one package is stopped because of a failure or the like, the other package takes over the processing. Therefore, the overall function is not easily corrupted, and a highly reliable apparatus can be realized. In an apparatus having packages duplexed, the contents of a memory of an active system package must be identical to those of a memory of an inactive system package.

FIG. 3 shows the arrangement of an information processing apparatus in which packages are duplexed in this manner. Referring to FIG. 3, reference numeral 21 denotes a CPU (Central Processing Unit), of a package A, which is a microprocessor; 22, a CPU of a package B, which is a microprocessor; 23, a memory connected to the CPU 21; 24, a memory connected to the CPU 22; 25, a buffer of the package A, which is connected between the CPU 21 and the package B; 26, a buffer of the package B, which is connected between the CPU 22 and the package A; 27, a selection circuit of the package A, which serves to select the CPU 21 or the buffer 26; and 28, a selection circuit of the package B, which serves to select the CPU 22 or the buffer 25.

The CPUs 21 and 22 and the buffers 25 and 26 are connected to each other via data buses 31, address busses 32, and control buses 33. The CPUs 21 and 22 and the memories 23 and 24 are also connected through the selection circuits 27 and 28 via the above buses. The buffer 25 and the selection circuit 28 of the package B are connected to each other via the data bus 31, the data bus 32, and the control bus 33, so are the buffer 26 and the selection circuit 27 of the package A. That is, the selection circuit 28 receives data and control signals from the CPUs 21 and 22.

The selection circuits 27 and 28 connect the memory 23 to one of the CPUs 21 and 22 which is in an active state in accordance with a monitor signal indicating which specific one of the CPUs 21 and 22 is in an active state. If, for example, the package A is in an active state, the CPU 21 is ready to perform processing. Therefore, the selection circuit 27 connects the memory 23 to the CPU 21, and the selection circuit 28 of the package B connects the memory 24 to the CPU 21 via the buffer 25. With this connection, the CPU 21 can update identical data in the memories 23 and 24 so that the memories 23 and 24 always hold the same contents.

In the conventional duplex processing apparatus having the above arrangement, since the CPU 21 in an active state must perform update processing of data in the memory 24 as well as update processing of data in the memory 23, the load on the CPU 21 is heavy.

SUMMARY OF THE INVENTION

It is an object of the present invention to provide a system for updating an inactive system memory, which can update the contents of a memory of an inactive package without imposing a heavy load on a microprocessor of an active package.

In order to achieve the above object, according to the present invention, there is provided a system for updating an inactive system memory, comprising a first package set in an active state and having a first processor and a first memory from/in which data is read/written in accordance with address, read control, and write control signals output from the first processor, and a second package set in an inactive state and having a second processor for backing up the first processor and a second memory in which data identical to data in the first memory is stored and from/in which data is read/written in accordance with address, read control, and write control signals output from the second processor. The first package includes a first buffer memory, first write control means for outputting a write control signal and an address signal to the first buffer memory in accordance with the write control signal output from the first processor to the first memory, and first holding means for holding update data and the address signal output from the first processor to the first memory, and outputting held contents as data of the first buffer memory in accordance with the write control signal output from the first write control means to the first buffer memory. The second package includes a second buffer memory, second write control means for outputting a write control signal and an address signal to the second buffer memory in accordance with the write control signal output from the second processor to the second memory, and second holding means for holding update data and the address signal output from the second processor to the second memory, and outputting held contents as data of the second buffer memory in accordance with the write control signal output from the second write control means to the second buffer memory, wherein the second processor in an inactive state updates the second memory in accordance with the update data and address data set for the first memory and stored in the first buffer memory.

BRIEF DESCRIPTION OF THE DRAWINGS

FIGS. 2A to 2F are timing charts showing a write operation with respect to a dual-port memory in FIG. 1.

DESCRIPTION OF THE PREFERRED EMBODIMENT

Figure 1:
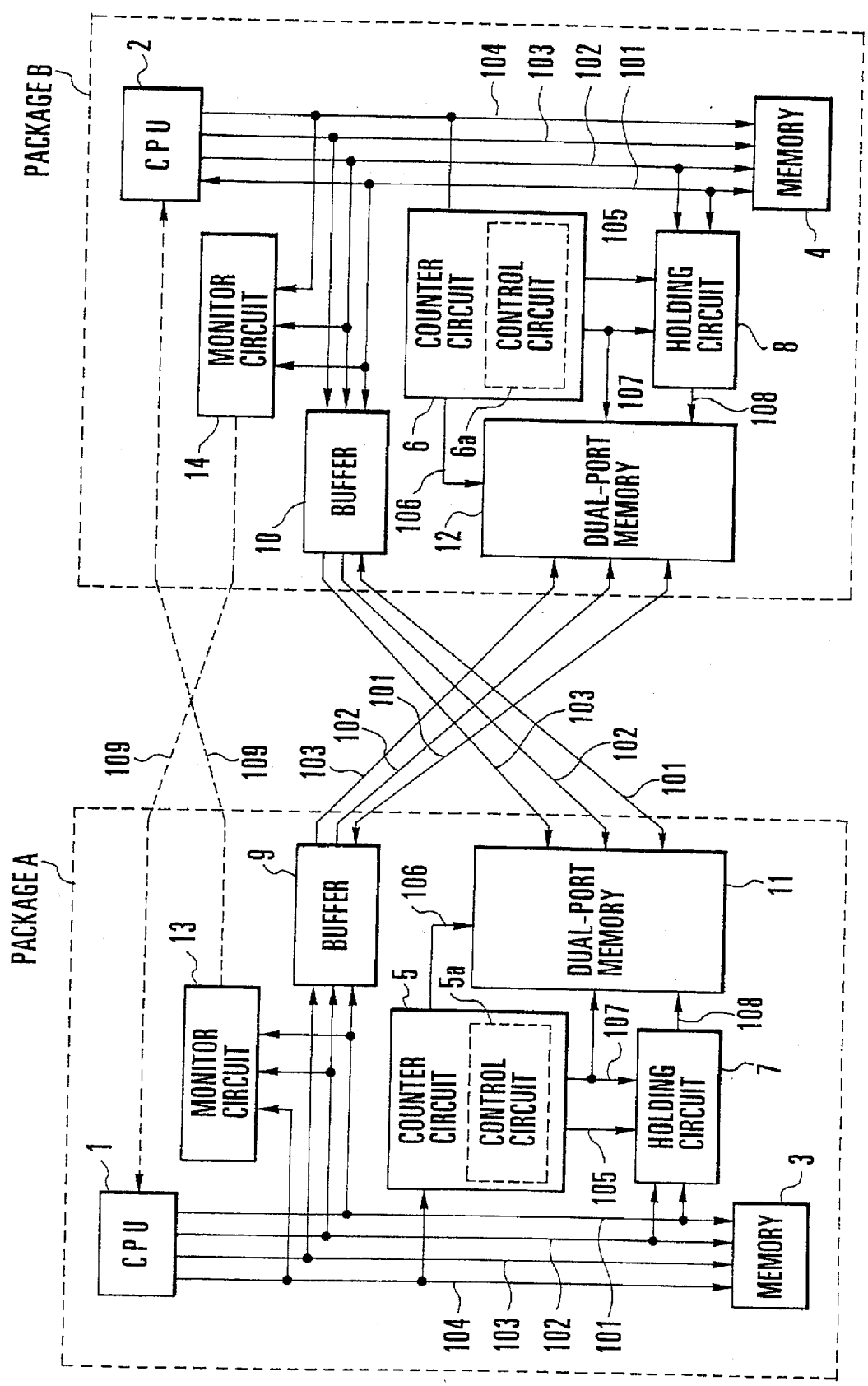
FIG. 1 is a block diagram showing the arrangement of a system for updating an inactive system memory in a duplex processing apparatus according to an embodiment of the present invention.
Figure 3:
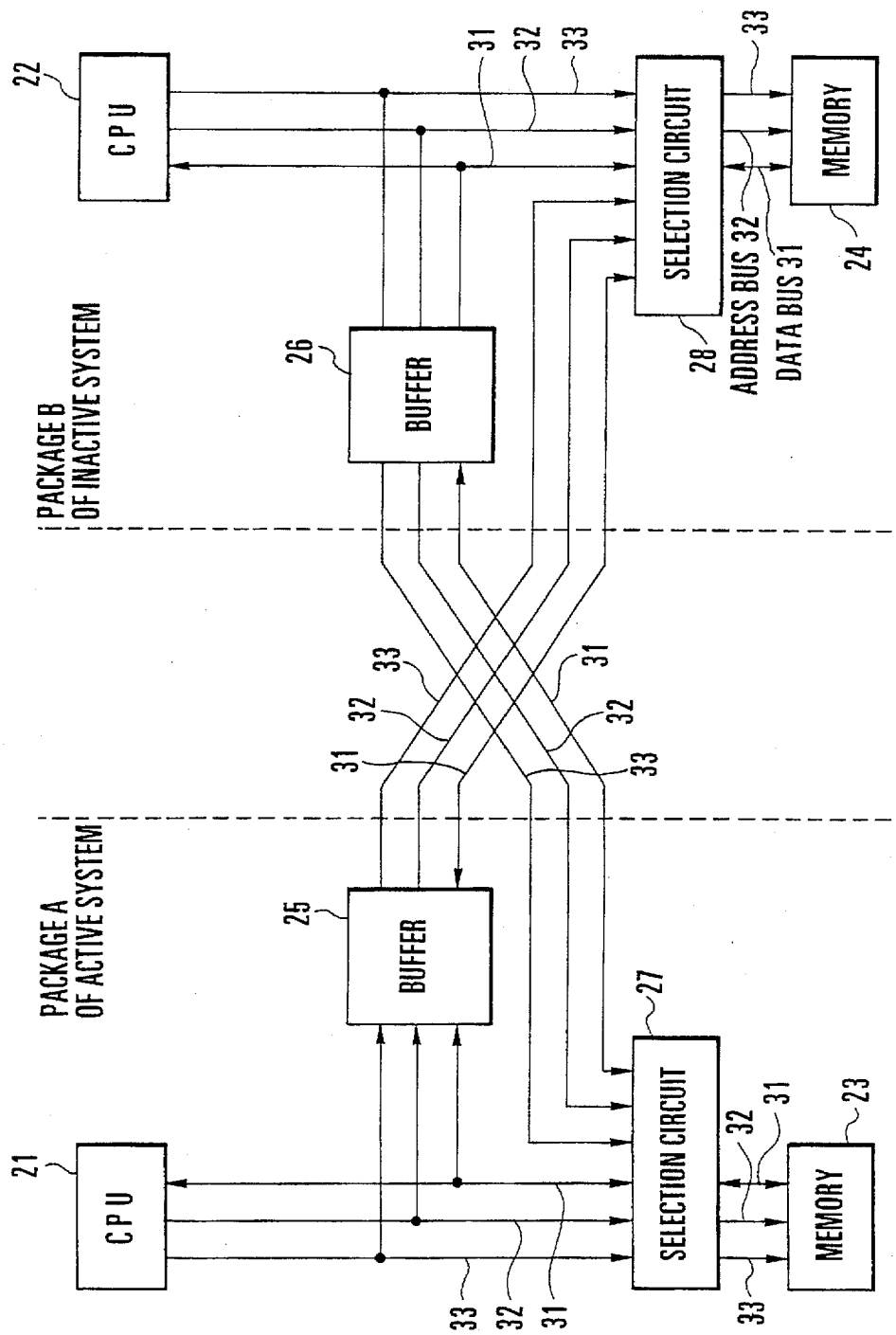
FIG. 3 is a block diagram showing the arrangement of a conventional duplex processing apparatus.

An embodiment of the present invention will be described below with reference to the accompanying drawings. FIG. 1 shows the arrangement of a system for updating an inactive system memory according to the present invention.

Referring to FIG. 1, reference numeral 1 denotes a CPU of a package A, which is a processor; 2, a CPU of a package B, which is a processor; 3, a memory of the package A, which is connected to the CPU 1; 4, a memory of the package B, which is connected to the CPU 2; 5, a counter circuit, of the package A, which is connected to the CPU 1 via a write control bus 104; 6, a counter circuit of the package B, which is connected to the CPU 2 via a write control bus 204; 7, a holding circuit of the package A, which is connected to the CPU 1 via an address bus 102 and a data bus 101; 8, a holding circuit of the package B, which is connected to the CPU 2 via a data bus 201 and an address bus 202; 9, a buffer of the package A, which is connected to the CPU 1 via an address bus 102 a read control bus 103 and the data bus 101; 10, a buffer of the package B, which is connected to the CPU 2 via an address bus 202 and a read control bus 203; 11, a dual-port memory (first buffer memory) of the package A in which output data 108 from the holding circuit 7 is written in accordance with an address signal (count value) 106 and a write control signal 107 from the counter circuit 5; 12, a dual-port memory (second buffer memory) of the package B in which output data 208 from the holding circuit 8 is written in accordance with an address signal (count value) 206 and a write control signal 207 from the counter circuit 6; 13, a monitor circuit of the package A, which is connected to the CPU 1 via a data bus 101, an address bus 102, and a write control bus 104; and 14, a monitor circuit of the package B, which is connected to the CPU 2 via a data bus 201, an address bus 202, and a write control bus 204.

The counter circuits 5 and 6 respectively have control circuits 5a and 6a for outputting latch signals 105 to the holding circuits 7 and 8, and also outputting the write control signals 107 to the holding circuits 7 and 8 and the dual port memories 11 and 12. In addition, the counter circuits 5 and 6 output the address signals 106 and 206 respectively, each consisting of a counter value corresponding to the write control signals 107 and 207, to the dual port memories 11 and 12, respectively.

In response to the latch signals 105 and 205 from the counter circuits 5 and 6, the holding circuits 7 and 8 simultaneously load update data on the data buses 101 and address data on the address buses 102 and 202, respectively. The holding circuit 7 reads out the address data and the update data in this order at the timing designated by the control signal 107 from the counter circuit 5, and outputs the readout data 108 to the dual-port memory 11.

The CPU 1 and the memory 3 are connected to each other via the data bus 101, the address bus 102, the read control bus 103, and the write control bus 104. The CPU 2 and the memory 4 are connected to each other via the data bus 201, the address bus 202, the read control bus 203 and the write control bus 204. The dual-port memory 11 and the buffer 10 are connected to each other via the data bus 301. The address bus 302, and the read control bus dual-port memory 12 and the buffer 9, are connected to each other via the data bus 401, the address bus 402 and the read control bus 403.

A data update operation in a case wherein the package A is an active state will be described next with reference to the timing charts in FIGS. 2A to 2F. When the memory 3 is to be updated, the CPU 1 of the package A controls data on the data bus 101, the address bus 102, and the write control bus 104 in accordance with contents to be updated. In addition, the CPU 1 writes monitor data at a predetermined monitor address in the memory 3 at a predetermined period.

The control circuit 5a of the counter circuit 5 fetches a write control signal (FIG. 2C), on the write control bus 104, which is supplied from the CPU 1 when it updates the contents of the memory 3, and outputs the latch signal 105 synchronized with the fetched write control signal.

In response to the latch signal 105 from the counter circuit 5, the holding circuit 7 simultaneously holds address data ADD (FIG. 2A) on the address bus 102 and update data DATA (FIG. 2B) on the data bus 101 at the timing of the write control signal (FIG. 2C), and repeats this holding operation for each write control signal on the write control bus 104. Note that the holding circuit 7 reads/writes data according to a first-in first-out scheme. The amount of data held in the holding circuit 7 is set in accordance with the amount of update data.

When no write control signal is output to the write control bus 104, the control circuit 5a of the counter circuit 5 determines that the CPU 1 has completed update processing of the memory 3. Subsequently, the control circuit 5a repeatedly outputs a pair of control signals 107 shown in FIG. 2F to the holding circuit 7 and the dual-port memory 11 in accordance with the amount of data held in the holding circuit 7. In addition, the counter circuit 5 increments the value of the address signal 106 by "1", as shown in FIG. 2D, and outputs the signal to the dual-port memory 11 every time the write control signal 107 is output to the dual-port memory 11.

The holding circuit 7 delimits the contents of held data from the address bus 102 and the data bus 101 for each predetermined data amount, and sequentially selects and outputs the delimited data in accordance with the write control signal 107 output from the counter circuit 5. That is, data held in the holding circuit 7 is read out at the falling edge of the write control signal 107 (FIG. 2F) from the counter circuit 5 and output to the dual-port memory 11, as shown in FIG. 2E.

The dual-port memory 11 stores the data 108, output from the holding circuit 7, at the address designated by the address signal 106 from the counter circuit 5 at the rising edge of the write control signal 107 from the counter circuit 5. That is, the address data ADD is stored at address "n"; and the update data DATA, at address "n+1". Subsequently, the write control signal 107 and the address signal 106 are repeatedly output from the counter circuit 5, so that update data identical to the update data in the memory 3 is stored in the dual-port memory 11.

Monitor data for a check and a monitor address are stored in the monitor circuit 13 in advance. The monitor circuit 13 monitors runaway of the CPU 1 by checking whether monitor data and a monitor address output from the CPU 1 at a predetermined period coincide with the stored data. The monitor circuit 13 detects runaway of the CPU 1 when the above data do not coincide with each other. The monitor circuit 13 then notifies this state to the CPU 2 of the package B in an inactive data via a notification line 109. Note that the monitor circuit 13 may check monitor data read out from the memory 3 by the CPU 1 instead of checking monitor data written in the memory 3 by the CPU 1.

While the CPU 2 of the package B receives a notification indicating the normal state of the CPU 1 from the monitor circuit 13 of the package A, the CPU 2 constantly checks the contents of the dual-port memory 11 of the package A via the buffer 10, the data bus 301, the address bus 302, and the read control bus 303. That is, read control of the dual-port memory 11, including read address control, is performed by the CPU 2. If data stored in the memory 4 at an address identical to an address read out from the dual-port memory 11 does not coincide with data read out from the dual-port memory 11, the CPU 2 determines that the memory 3 is updated. Upon determining that the memory 3 is updated, the CPU 2 writes the readout update data in the memory 4 at an address identical to the readout address data, thereby updating the memory 4 to have the same contents as those of the memory 3. Note that since the dual-port memory 11 is capable of simultaneous data write and read operations, the memory 4 can be updated while update data or the like is written in the dual-port memory 11.

In contrast to this, if the CPU 2 of the package B receives a notification indicating runaway of the CPU 1 from the monitor circuit 13 of the package A via the notification line 109, the CPU 2 does not update the memory 4 in accordance with the contents of the dual-port memory 11.

If some addresses of the memory 3 are designated in updating the memory 3, only data corresponding to the update portions are stored in the dual-port memory 11. In contrast to this, if data are to be overwritten at all the addresses of the memory 3, including addresses at which no data are to be updated, the contents of the dual-port memory 11 become identical to those of the memory 3, and the CPU 2 updates only necessary addresses of the memory 4.

In the above embodiment, read control of the holding circuit 7 is performed by using the write control signal 107 for the dual-port memory 11 as a read control signal. However, a read control signal dedicated to the holding circuit 7 may be output from the control circuit 5a of the counter circuit 5 independently of the write control signal 107.

Furthermore, according to the above description, the dual-port memory 11 having one input port is used. However, a multi-port memory having two input ports may be used, and address data and update data simultaneously output from the holding circuit 7 may be separately supplied to the two input ports of the multi-port memory.

As has been described above, according to the present invention, in the first package in an active state, when the first memory is to be updated by the first microprocessor, the update contents are stored in the first buffer memory as well as in the first memory. The second microprocessor of the second package in an inactive state reads out the contents of the first buffer memory and writes the contents in the second memory of the second package in the inactive state. Therefore, no processing load is imposed on the first microprocessor of the first package in the active state.

In addition, the second microprocessor of the second package in the inactive state can recognize runaway of the first microprocessor of the first package. This prevents update processing of erroneous memory contents based on runaway of the microprocessor of the first package.

Furthermore, since a dual-port memory is used as a buffer memory, the second microprocessor can update the second memory at the same time while the first microprocessor updates the first memory.

What is claimed is:

1. A multi-processor system in which one processor maintains a mirror of data stored in a memory of another processor comprising:

a first processor including a first processing unit having means for generating a first data signal, a first address signal, a first write control signal and a first read control signal, and means for receiving a first failure signal;

a first main memory having means for storing and retrieving said first data in accordance with said first write control signal and said first address signal;

a first holding memory having means, responsive to said first write control signal for storing a sequence of said first data signals and first address signals, and means responsive to a second write control signal for sequentially outputting said stored sequence;

means for detecting a sequence of said first write control signals, including a counter for counting a number of signals in said sequence and for generating a corresponding count value, means for detecting a termination of the sequence, means for generating a sequence of said second write control signals in accordance with said detected termination and said count value, means for sequentially decrementing said count value and outputting a second address signal representing said decremented count value;

a dual port memory having a first data port for receiving the sequentially output stored sequence from said first holding memory and storing said sequence in accordance with said second address signal and said second write control signal, and having a second data port and means for receiving a third address signal and receiving a second read control signal and means for outputting said sequentially stored sequence to said second data port in accordance with said third address signal and said second read control signal;

means for detecting a failure of said first processing unit and for generating a second failure signal in response thereto;

buffer means for outputting said first data signal, said first address signal and said first read control signal; and a second processor having means for generating said third address signal and said second read control signal and means for receiving a data from said second port of said dual port memory of said first processor corresponding to said third address and said second read control signal utilizing a second buffer means of said second processor.

2. A multiprocessor system according to claim 1 wherein said second processor comprises:

a second processing unit having means for generating a third data signal, said third address signal, a third write control signal and said second read control signal, and means for receiving said second failure signal;

a second main memory having means for storing and retrieving said second data in accordance with said third write control signal and said third address signal;

a second holding memory having means, responsive to said third write control signal, for storing a sequence of said second data signals and said third address signals, and means responsive to a fourth write control signal for sequentially outputting said stored sequence; and means for detecting a sequence of said third write control signals, including a counter for counting a number of signals in said sequence and generating a count value, means for detecting a termination of the sequence, means for generating a sequence of said fourth write control signals in accordance with said detected termination and said count value, means for sequentially decrementing said count value and outputting a fourth address signal representing said decremented count value.

3. A multiprocessor system according to claim 2 wherein said second processor further comprises:

a second dual port memory having a first data port for receiving the sequentially output stored sequence from said second holding memory and storing said sequence in accordance with said fourth address signal and said fourth write control signal, and having a second data port and means for receiving a third address signal and a second read control signal and means for outputting said sequentially stored sequence to said second data port in accordance with said third address signal and a second read control signal;

means for detecting a failure of said first processing unit and for generating a first failure signal in response thereto; and means for outputting said second data signal, said third address signal and said third read control signal.

* * * * *